H. W. BROWN.
ELECTRIC MEASURING INSTRUMENT.
APPLICATION FILED OCT. 8, 1910.

1,189,234. Patented July 4, 1916.

WITNESSES:
Fred H. Miller

INVENTOR
Harold W. Brown
BY
ATTORNEY

UNITED STATES PATENT OFFICE.

HAROLD W. BROWN, OF WILKINSBURG, PENNSYLVANIA, ASSIGNOR TO WESTING-HOUSE ELECTRIC AND MANUFACTURING COMPANY, A CORPORATION OF PENN-SYLVANIA.

ELECTRIC MEASURING INSTRUMENT.

1,189,234.   Specification of Letters Patent.   Patented July 4, 1916.

Application filed October 8, 1910. Serial No. 586,088.

*To all whom it may concern:*

Be it known that I, HAROLD W. BROWN, a citizen of the United States, and a resident of Wilkinsburg, in the county of Allegheny and State of Pennsylvania, have invented a new and useful Improvement in Electric Measuring Instruments, of which the following is a specification.

My invention relates to electric measuring instruments and it has special reference to instruments of the motor type which comprise stationary and rotating parts.

The object of my invention is to provide simple and effective means for recording or indicating electric circuit variations by utilizing a meter mechanism of the type referred to above, the arrangement of parts being such that the position of the marker or pointer is dependent upon the torque exerted by the rotating part of the meter.

Meters or instruments of the motor type have been used extensively for integrating instruments but, for recording and indicating purposes, meter mechanisms embodying movable members having limited adjustment relative to the stationary members have usually been employed.

According to my present invention, I materially simplify the operating parts of a recording instrument by making use of a meter mechanism comprising a rotatable member which exerts varying torques according to predetermined changes in the electric circuit to which the meter is connected.

Figure 1:
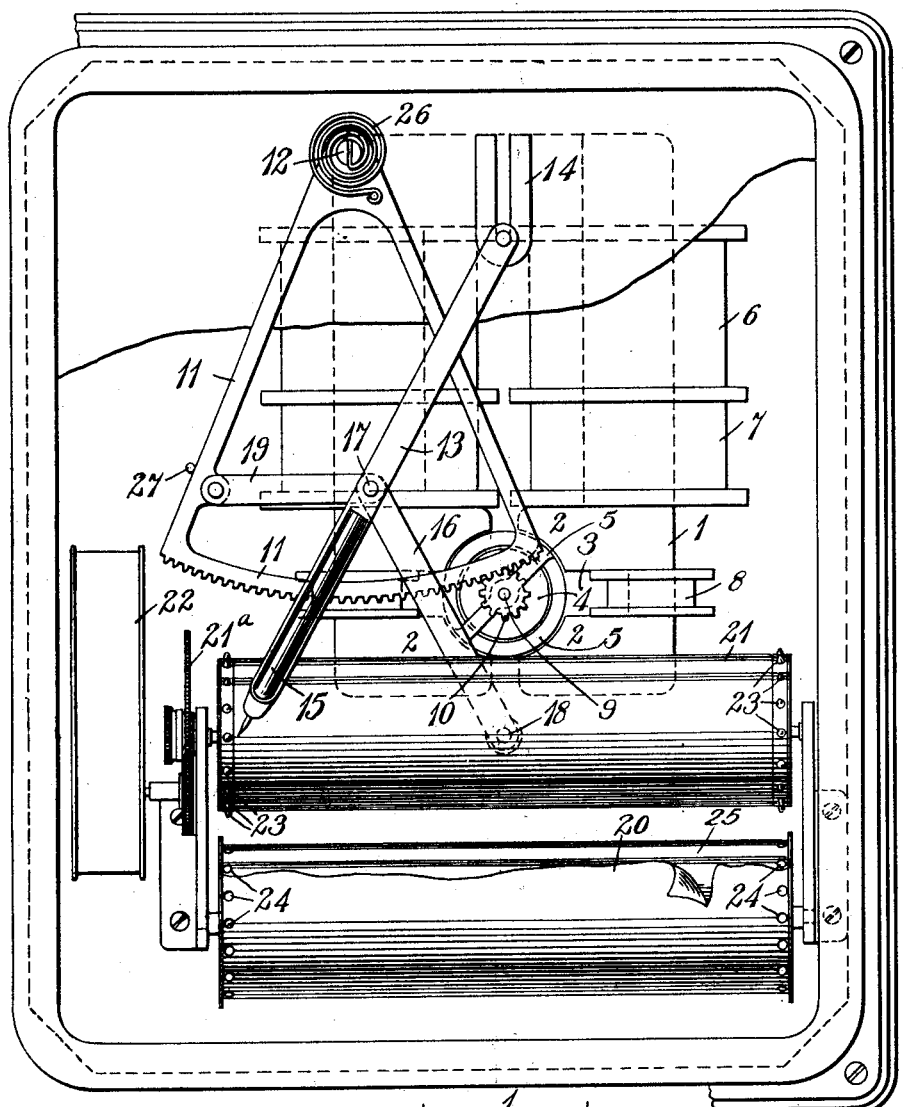
Figure 2:
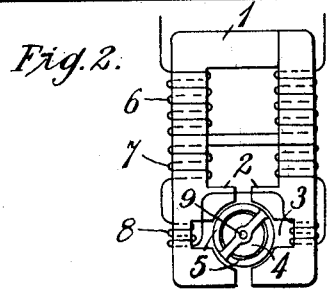

Figure 1 of the accompanying drawings is an elevation of a measuring instrument constructed in accordance with my invention, and Fig. 2 is a diagrammatic view showing the circuit connections for the meter mechanism of the instrument shown in Fig. 1.

Referring to the drawings, the device here shown comprises a stationary core member 1 having pole pieces 2, a stationary cylindrical core member 4 which is adapted to decrease the reluctance of the magnetic circuit and a rotatable armature 5 which is of hollow cylindrical form and operates in the air gap between two stationary core members.

The electro-magnetical portions of the instrument constitute practically a series transformer in which the outer coils 6 form the primary winding and the inner coils 7 the secondary winding. The secondary winding is connected in series with auxiliary coils 8 which surround the portions of the pole pieces that are reduced in section by the recesses 3.

The hollow cylindrical member 5 is supported by a shaft 9 which is provided at one end with a pinion 10.

The meter mechanism forms no part of my present invention and may be replaced by any suitable mechanism comprising a movable member in which a torque is produced that is dependent on predetermined variations in the electric circuit to which the device is connected.

The mechanism illustrated is particularly adapted for use on alternating current circuits and is shown and described in Patent No. 794,395, granted July 11, 1905, to the Westinghouse Electric & Manufacturing Co., on an application filed January 20, 1904, by Frank Conrad.

The recording mechanism of the instrument comprises a gear segment 11 which is pivotally mounted on a shaft 12 and meshes with the pinion 10, a lever 13 which is adjustably supported in a slotted bracket 14 and carries a reservoir pen 15, or other marking device, at its opposite extremity; a guide link 16, which is pivotally connected to an intermediate point 17 in the link 13 and is pivotally supported on a stationary pin or shaft 18 at its opposite end, and a link 19 which forms an operative connection between the gear segment 11 and the lever 13. The gear segment 11 is provided with a spiral spring 26 which tends to oppose the movement produced by the movable member 5 of the meter mechanism.

The pen, or other marking device, 15 is moved over a record strip 20, carried by a platen roll 21. The dimensions and arrangements of the levers just described are such that rotative movements of the gear segment 11 produce a stright-line movement of the pen across the face of the platen roll. Circular or other movements of the pen may be produced according to the record desired.

The platen roll may be operated in any suitable manner and is preferably driven through intermediate gearing 21$^a$ by means of a clock mechanism (not shown) that is supported in the frame 22. The clock is preferably of the self-winding type in order that the record strip may be continuously operated without interruption.

The ends of the platen roll are provided with teeth, or projections, 23, that are adapted to register with corresponding apertures 24 in the edges of the record strip, the strip being thereby drawn from a supply roll 25.

The structural details of the clock form no part of my present invention and, since such structures are well known to the art, I deem it unnecessary to include a detailed description of the parts.

The operation of the instrument is as follows: Assuming that the parts occupy the positions shown in the drawings, the gear segment 11 being held against a stop 27 by means of the spring 26, if the instrument is connected to an electric circuit a torque will be produced in the rotating member 5 of the meter mechanism which will cause the pinion to rotate and the gear segment to move in opposition to the spring. The extent to which the segment will be adjusted will depend upon the torque exerted by the member 5 since the opposing action on the spring increases as it is wound up and, consequently, the parts will come to rest when the two forces are equal. As the circuit conditions vary, the segment will be adjusted in the one direction or the other, according as the spring or the torque of the meter mechanism predominates. Since the link 13 is connected to the gear segment by means of the link 19, the movement of the gear segment will produce a corresponding movement of the link and, since the fountain pen or other marking device, 15, is attached to the link and rests on the record strip 20, a record will be produced which will depend upon the torque variations in the meter mechanism and it is only necessary to properly calibrate the record strip and adjust the spring in order to secure a true record of the current or other variations in the electric circuit to which the meter is connected.

The recording mechanism of my invention will commend itself to those skilled in the art, not only on account of its simplicity, but also by reason of the fact that it is equally applicable for use with meter mechanisms of various kinds which may be adapted for single or polyphase alternating current or for direct current circuits.

By properly determining the direction of application for the link 19, the scale divisions on the record strip, or on an indicating dial, may be made substantially uniform.

The gear segment 11 may obviously be replaced by a rack or by some other suitable means for producing any desired adjustment of the pen or marking device, in response to a rotary movement of the armature or rotor of the meter mechanism. The fact that a number of complete revolutions of the rotor are permitted tends to increase the torque and reduce the amount of energy necessarily expanded in the meter. The accuracy of the record for the expenditure of a given amount of energy is accordingly increased.

The spiral spring 26 may, of course, be replaced by springs of other kinds, by a system of weights which depend upon the attraction of gravity, or by some other equivalent device. If weights are employed, however, they must act in such a way as to offer increasing opposition to the increasing torques exerted by the meter. I desire that only such limitations shall be imposed as are indicated in the appended claims.

I claim as my invention:

1. In a measuring instrument for an electric circuit, the combination with a meter mechanism comprising a rotatable member and a stationary member connected directly to the electric circuit, of a reducing gearing directly actuated by the rotatable member, a marking device actuated by the reducing gearing, and a resilient means for so directly opposing the torque of the rotatable member that the rotatable member is returned to its initial position when no current traverses the circuit.

2. In a measuring instrument for an electric circuit, the combination with a meter mechanism comprising a rotatable member and a stationary member connected directly to the electric circuit, of a reducing gearing directly actuated by the rotatable member, a marking device actuated by the reducing gearing, and means for opposing the torque of the rotatable member whereby the marking device is adjusted to a greater or less degree in proportion to the electric-circuit variations.

3. In a measuring instrument for an electric circuit, the combination with a meter mechanism comprising a rotatable member actuated directly by the energy traversing the electric circuit, of a marking device, a reducing gearing actuated by the rotatable member and adapted to operate the marking device, and yielding means for so opposing the torque exerted by the rotatable member as to return the rotatable member to its initial position under predetermined conditions.

4. A measuring instrument for an electric circuit comprising a meter armature adapted to be actuated directly by the energy traversing the circuit, a reduction gearing connected directly to the armature, a marking device actuated by the armature through the reduction gearing, and a spring for opposing the operation of the armature and in coöperation therewith to actuate the marking device in accordance with the energy traversing the circuit.

5. A measuring instrument for an electric circuit comprising a meter armature operatively connected to the circuit and adapted to move through a plurality of complete rotations, means for opposing the torque of the armature, a pinion operatively connected to the armature, a straight-line-motion device actuated by the said pinion, and a marking device actuated by the said straight-line-motion device.

6. A measuring instrument for an electric circuit comprising a single motor-meter connected to the circuit, a pinion operatively connected to the armature thereof, a straight-line-motion device actuated by the pinion, a marking device actuated by the said straight-line-motion device and a spring for opposing the rotation of the armature.

In testimony whereof, I have hereunto subscribed my name this 3rd day of October, 1910.

HAROLD W. BROWN.

Witnesses:
JOHN MORAN,
B. B. HINES.

Copies of this patent may be obtained for five cents each, by addressing the "Commissioner of Patents, Washington, D. C."